United States Patent
Pfaff et al.

(10) Patent No.: US 12,353,205 B2
(45) Date of Patent: Jul. 8, 2025

(54) REMOTE CONTROL FOR A POWER MACHINE

(71) Applicant: Doosan Bobcat North America, Inc., West Fargo, ND (US)

(72) Inventors: John Pfaff, Bismarck, ND (US); Matti Maurice Kariluoma, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 303 days.

(21) Appl. No.: 17/886,297

(22) Filed: Aug. 11, 2022

(65) Prior Publication Data

US 2023/0048274 A1 Feb. 16, 2023

Related U.S. Application Data

(60) Provisional application No. 63/231,971, filed on Aug. 11, 2021.

(51) Int. Cl.
| | |
|---|---|
| G05D 1/00 | (2024.01) |
| E02F 9/20 | (2006.01) |
| G08C 17/02 | (2006.01) |

(52) U.S. Cl.
CPC ........... *G05D 1/0016* (2013.01); *E02F 9/205* (2013.01); *G08C 17/02* (2013.01)

(58) Field of Classification Search
CPC ........ G05D 1/0016; E02F 9/205; G08C 17/02
See application file for complete search history.

(56) References Cited

U.S. PATENT DOCUMENTS

| | | | |
|---|---|---|---|
| 6,167,337 A | 12/2000 | Haack et al. | |
| 8,195,358 B2 | 6/2012 | Anderson | |
| 8,467,943 B2 | 6/2013 | Dersjo et al. | |
| 9,217,240 B2 | 12/2015 | Shibata | |
| 9,550,499 B2 | 1/2017 | Sakai | |
| 9,649,999 B1 | 5/2017 | Amireddy et al. | |
| 9,982,415 B2 | 5/2018 | Yamada et al. | |

(Continued)

FOREIGN PATENT DOCUMENTS

| | | |
|---|---|---|
| EP | 1452651 A1 | 9/2004 |
| EP | 1767708 A2 | 3/2007 |

(Continued)

OTHER PUBLICATIONS

International Searching Authority, International Search Report and Written Opinion for counterpart application PCT/US2022/040106. Mailed on Dec. 5, 2022 [16 pgs].

*Primary Examiner* — Adam D Tissot
(74) *Attorney, Agent, or Firm* — Quarles & Brady LLP

(57) ABSTRACT

A control system for remotely controlling a power machine is provided. The remote control system can include a hand-held remote control device configured to be in communication with a mobile device. The hand-held remote control device can include a plurality of operator input modules configured for manual actuation. The mobile device can be configured to be operatively connected to the power machine by a wireless communication system. The mobile device can be configured to receive an input from the hand-held remote control device, and output a command signal to a control system on the power machine based on the received input to command one or more functions of the power machine.

20 Claims, 10 Drawing Sheets

(56) References Cited

U.S. PATENT DOCUMENTS

| | | |
|---|---|---|
| 10,144,390 B1 | 12/2018 | Chaston et al. |
| 10,214,877 B2 | 2/2019 | Yamada et al. |
| 10,337,174 B2 | 7/2019 | Okumura et al. |
| 10,474,228 B2 | 11/2019 | Niccolini et al. |
| 10,669,693 B2 | 6/2020 | Wei |
| 10,717,200 B2 | 6/2020 | Machida et al. |
| 10,788,821 B2 | 9/2020 | Matsuzaki et al. |
| 11,062,511 B2 | 7/2021 | Hendron |
| 11,068,015 B2 | 7/2021 | Ofenloch et al. |
| 11,389,721 B2 * | 7/2022 | Khaira .................... A63F 13/23 |
| 2001/0022818 A1 | 9/2001 | Nagata et al. |
| 2016/0130785 A1 | 5/2016 | Geier et al. |
| 2017/0284069 A1 | 10/2017 | Machida et al. |
| 2018/0240329 A1 * | 8/2018 | Steinmetz ............ H05K 5/0017 |
| 2019/0284027 A1 | 9/2019 | Albrecht |
| 2019/0322496 A1 | 10/2019 | Hayashi |
| 2019/0387219 A1 | 12/2019 | Kondo et al. |
| 2020/0018049 A1 | 1/2020 | Takahama et al. |
| 2020/0063397 A1 | 2/2020 | Hatake et al. |
| 2020/0125114 A1 | 4/2020 | Minagawa et al. |
| 2020/0240110 A1 | 7/2020 | Takahama et al. |
| 2020/0392701 A1 | 12/2020 | Aizawa et al. |
| 2020/0399863 A1 | 12/2020 | Aizawa et al. |
| 2021/0002860 A1 | 1/2021 | Otani et al. |
| 2021/0010237 A1 | 1/2021 | Aizawa et al. |
| 2021/0029872 A1 | 2/2021 | Brandt |
| 2021/0032844 A1 | 2/2021 | Wagner |
| 2021/0062473 A1 | 3/2021 | Ding et al. |
| 2021/0230836 A1 | 7/2021 | Ding et al. |
| 2021/0256457 A1 | 8/2021 | Saiki et al. |

FOREIGN PATENT DOCUMENTS

| | | |
|---|---|---|
| EP | 3494773 A1 | 6/2019 |
| EP | 3556713 A1 | 10/2019 |
| EP | 3504148 B1 | 5/2020 |
| EP | 3754120 A1 | 12/2020 |
| EP | 3754122 A1 | 12/2020 |
| EP | 3767044 A1 | 1/2021 |
| WO | 2016031009 A1 | 3/2016 |
| WO | 2017174205 A2 | 10/2017 |
| WO | 2018124098 A1 | 7/2018 |
| WO | 2020054366 A1 | 3/2020 |
| WO | 2020170526 A1 | 8/2020 |
| WO | 2020194882 A1 | 10/2020 |
| WO | 2020194883 A1 | 10/2020 |
| WO | 2020194884 A1 | 10/2020 |
| WO | 2020196874 A1 | 10/2020 |
| WO | 2020201473 A3 | 10/2020 |
| WO | 2020217972 A1 | 10/2020 |
| WO | 2020241640 A1 | 12/2020 |
| WO | 2020250557 A1 | 12/2020 |
| WO | 2020250558 A1 | 12/2020 |
| WO | 2020260427 A1 | 12/2020 |
| WO | 2021019948 A1 | 2/2021 |
| WO | 2021020567 A1 | 2/2021 |
| WO | 2021049614 A1 | 3/2021 |
| WO | 20210054417 A1 | 3/2021 |
| WO | 2021090906 A1 | 5/2021 |
| WO | 2021111677 A1 | 6/2021 |
| WO | 2021124654 A1 | 6/2021 |
| WO | 2021124858 A1 | 6/2021 |
| WO | 2021131136 A1 | 7/2021 |
| WO | 2021131161 A1 | 7/2021 |
| WO | 2021131228 A1 | 7/2021 |
| WO | 2021141077 A1 | 7/2021 |
| WO | 2021149775 A1 | 7/2021 |
| WO | 2021153187 A1 | 8/2021 |
| WO | 2021161692 A1 | 8/2021 |
| WO | 2021161693 A1 | 8/2021 |
| WO | 2021166476 A1 | 8/2021 |
| WO | 2021166477 A1 | 8/2021 |
| WO | 2021166559 A1 | 8/2021 |
| WO | 2021166566 A1 | 8/2021 |
| WO | 2021176883 A1 | 9/2021 |
| WO | 2021181916 A1 | 9/2021 |
| WO | 2021192483 A1 | 9/2021 |
| WO | 2021192491 A1 | 9/2021 |

* cited by examiner

REMOTE CONTROL FOR A POWER MACHINE

CROSS-REFERENCE TO RELATED APPLICATIONS

This application claims priority to, and incorporates by reference in entirety, U.S. Provisional Patent Application 63/231,971, filed Aug. 11, 2021.

BACKGROUND

This disclosure is directed toward power machines. More particularly, this disclosure is directed toward remotely controlling power machine functionality. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

The discussion above is merely provided for general background information and is not intended to be used as an aid in determining the scope of the claimed subject matter.

SUMMARY

Embodiments of the disclosed subject matter can use a hand-held remote control communicatively coupled to a mobile device to send and receive signals therebetween. A wireless connection between the mobile device and a power machine can allow for command signals based on the actuation of inputs on the remote control to be sent by the mobile device to the power machine to provide control (e.g., full control) over power machine functionality for a remote operator. Additionally, control signals from a remote control device can be analyzed to identify whether the control signals correspond to acceptable commands, and corrective control operations can be implemented accordingly.

According to some aspects of the present disclosure, a remote control system for a power machine is provided. The system can include a mobile device including a processor device and a wireless communication system. A hand-held remote control device can include a remote control communication module configured to be in communication with the mobile device, wherein the hand-held remote control device includes a plurality of operator input modules configured for manual actuation to generate operator input signals for transmission by the remote control communication module. The mobile device can be configured to be operatively connected to the power machine by the wireless communication system of the mobile device. The processor device on the mobile device can be configured to: receive an operator input signal from the hand-held remote control device via the remote control communication module; and in response to receiving the operator input signal from the hand-held remote control device, output a command signal to a control system of the power machine via the wireless communication system to control an operation of the power machine based on operator inputs at the hand-held remote control device.

In some examples, a mobile device can include a smart phone or a tablet.

In some examples, an operator input signal from a hand-held remote control device can be generated by manual actuation of one or more operator input modules on the hand-held remote control device.

In some examples, a remote control communication module can be a wired communication module configured to be communicatively coupled to a mobile device by a wired connection to a wired communication module of the mobile device.

In some examples, a processor device of a remote control system can be configured to: generate a graphical user interface on a display of the mobile device, wherein the graphical user interface includes a plurality of digital inputs that are selectable on the display to generate corresponding signals for control of the power machine. Each of the plurality of operator input modules on the hand-held remote control device can correspond to a respective digital input of the plurality of digital inputs on the graphical user interface on the display of the mobile device.

In some examples, a first operator input module (e.g. a joystick) of a hand-held remote control device can be manually movable with a plurality of movement patterns corresponding to a plurality of operator input signals. An operator input signal received by a mobile device from the hand-held remote control device can correspond to a first of the movement patterns. A processor device on the mobile device can be configured to operate in an exception mode, including applying an exception modification to the command signal to control the power machine, in response to identifying that the first movement pattern corresponds to a first exception pattern. For example, a first operator input module includes a joystick, and a first movement pattern can include a movement pattern of the joystick within a spatial envelope defined by the hand-held remote control device.

In some examples, a first exception pattern can correspond to a mechanistically linear movement of the joystick. In some examples, a first exception pattern can correspond to a mechanistically fixed orientation of the joystick.

In some examples, applying an exception modification to a command signal can include de-rating the command signal.

In some examples, a processor device on a mobile device can be further configured to cease operation in an exception mode in response to receiving an operator input signal from a hand-held remote control device that does not correspond to a first exception pattern.

According to some aspects of the present disclosure, method of remotely operating a power machine is provided. The method can include electronically receiving an input command signal, at a mobile device, from a hand-held remote control device in electronic communication with the mobile device. In response to receiving the input command signal, an output command signal can be electronically provided, with the mobile device, to a control system on the power machine to control one or more power machine functions on the power machine. The input command signal can be generated by actuation of a first control input of a plurality of control inputs on the hand-held remote control device.

In some examples, a hand-held remote control device can be communicatively coupled to a mobile device by a wired connection between the hand-held remote control device and an input port of the mobile device.

In some examples, an input command signal can be electronically analyzed to determine whether the input command signal corresponds to an exception input. In response to determining that the input command signal corresponds to an exception input, an exception modification can be applied to generate an output command signal to control a power machine. In some cases, applying an exception modification to generate an output command signal can include derating the output command signal based on determining that an input command signal corresponds to a mobile operator input at a hand-held remote control device that is mechanistically linear for a command (e.g., a forward command or a reverse command). In some cases, applying an exception modification to generate an output command signal can include modifying a derating of an output command in response to an override input at the hand-held remote control device.

According to some aspects of the present disclosure, a remote control system for a power machine can include a user input interface. The user input interface can include a processor device, an operator input device adapted to receive manual operator inputs and provide corresponding control signals, and a wireless communication system. The processor device can be configured to: receive control signals corresponding to manual operator inputs at the operator input device; in response to receiving the control signals, cause the wireless communication system to transmit corresponding command signals to control operation of the power machine. Further, the process device can be configured to analyze a rate of change of control signals over time; and apply one or more exception modifications to generate corresponding command signals, in response to determining that the rate of change corresponds to an exception pattern for the operator input device.

In some examples, an exception pattern can correspond to a mechanistic movement of the operator input device (e.g., a mechanistically linear movement).

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
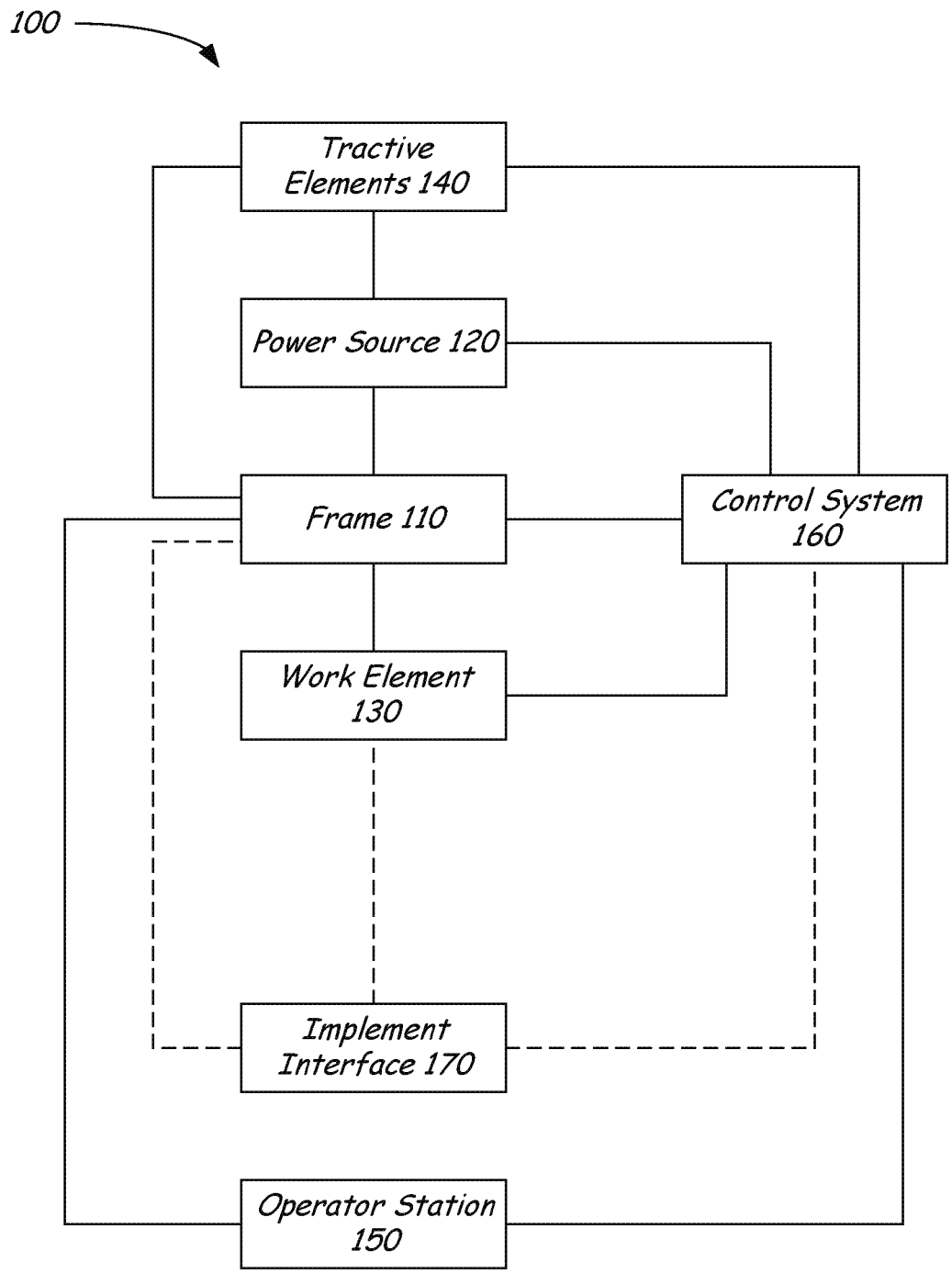
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As used herein, "power machine functionality" refers generally to movement- and power-based operations of a power machine, such as operation of a power source (e.g., engine or battery), a power conversion system that converts output from a power source into a form usable by work elements, and operation of work elements such as tractive elements and other actuators that can move work elements (e.g., lift arms or other devices), and so on. Power machine functionality can be distinguished from "operating system functionality," which refers specifically to operation of display screens or other input/output devices for a control system, operation of computer-based security systems (e.g., lock-out systems), and general operation of other electronic control devices (e.g., hub controllers, etc.). Of note, however, certain power machine functionality may necessarily include or rely on operating system functionality, including during electronic control of hydraulic equipment, user input interfaces (e.g., displays), sensors, switches, actuators, and signaling devices.

Also as used herein, operation of a power machine with "full" power machine functionality indicates operation of the power machine with power being available for all power machine functions without restriction, (i.e., normal power machine operation). Similarly, "full" control of a power machine indicates control of full power machine functionality.

Also as used herein, the phrase "mobile device" refers to a mobile phone (e.g., a feature phone or a smart phone), a tablet, or other mobile device that is configured for wireless communication (e.g., for communication over Wi-Fi (e.g., 2.4 GHz, 4G, 5G, etc.), Bluetooth, or other known wireless communication protocols) and can be individually electronically identified via wireless communication. (Bluetooth is a registered trademark of Bluetooth SIG, Inc. in the United States or other jurisdictions.)

Under conventional designs, power machines may be controlled from within an operator cab or an operator station on the power machine. Correspondingly, power machines generally include various control devices that control various functions, including one or more operator interfaces configured to receive operator inputs within an operator station.

According to some examples, the disclosed technology can provide systems and methods for remote control of a power machine using a remote control device in communication with a mobile device, including a smart phone. This can allow an operator to utilize a personal mobile device, connected with a separate remote control device (e.g., as customized for a particular machine, task, or company), and thereby remotely operate a power machine.

Figure 2:
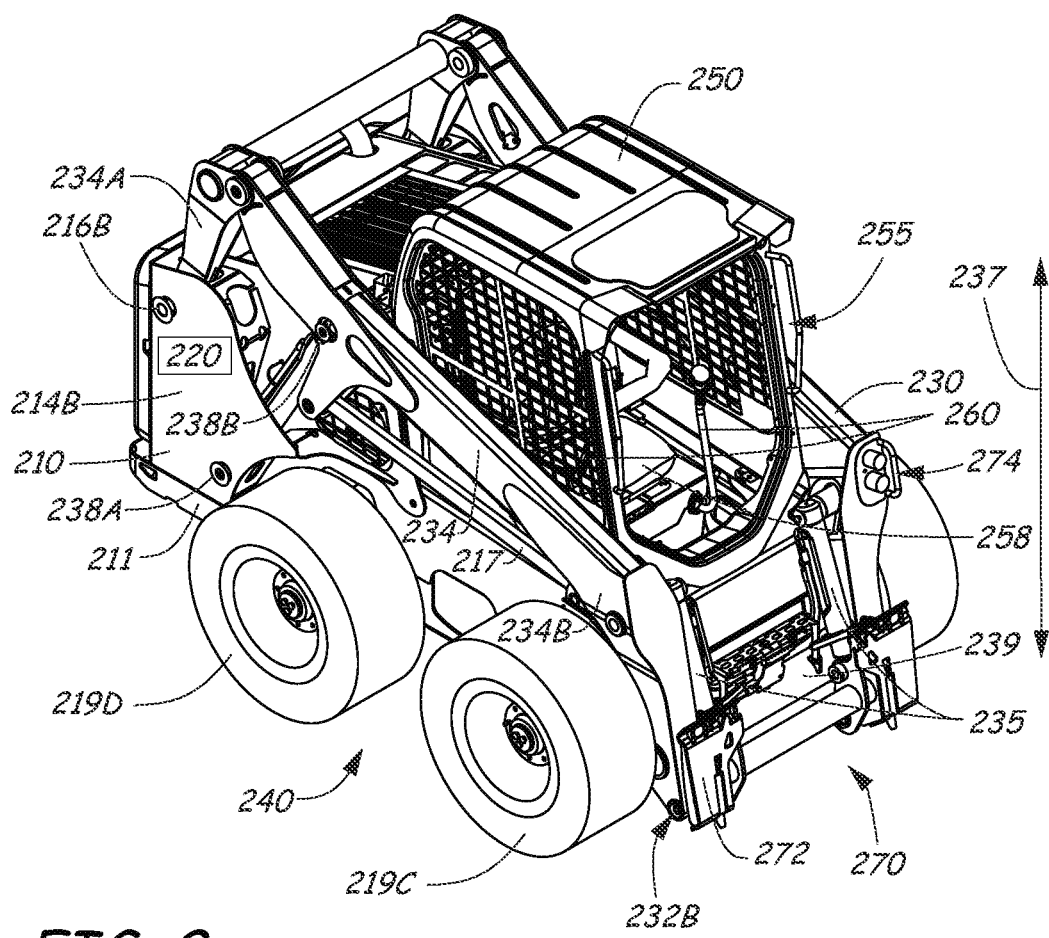
FIGS. 2-3 illustrate perspective views of a representative power machine in the form of a skid-steer loader of the type on which the disclosed embodiments can be practiced.
Figure 3:
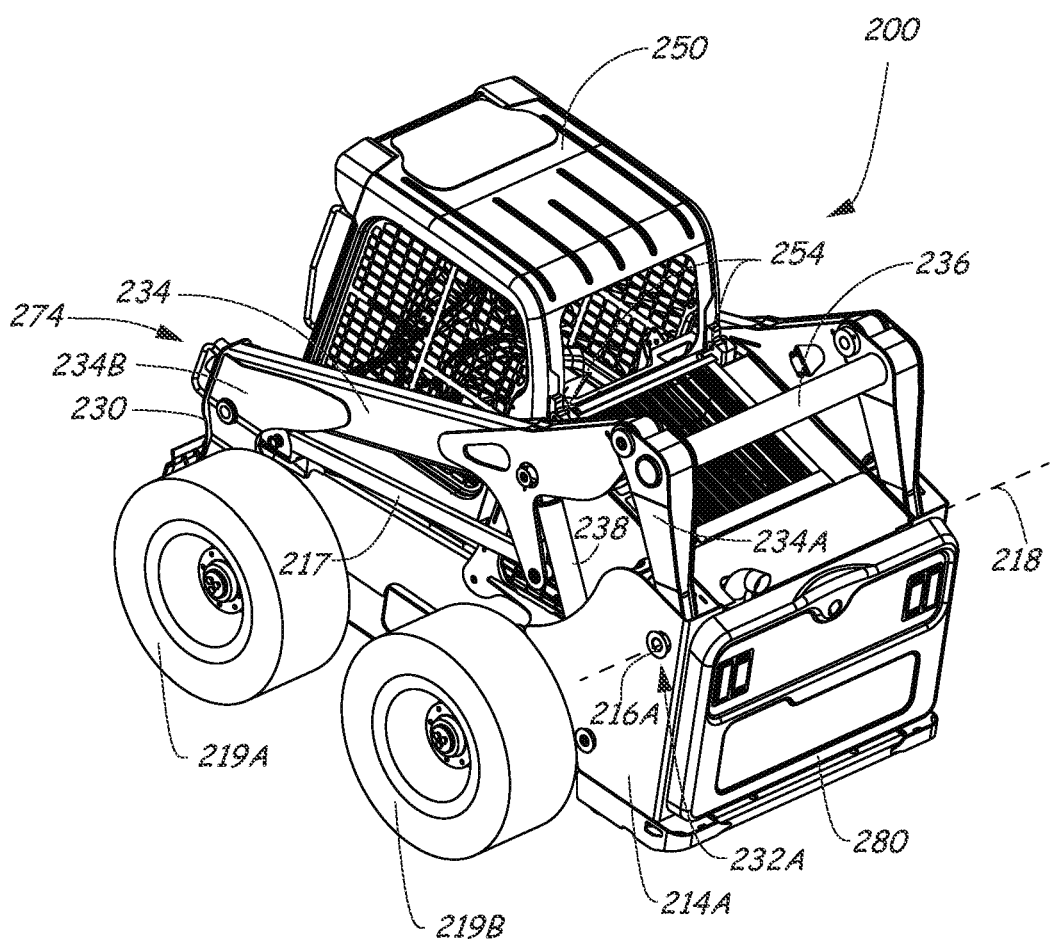

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some embodiments disclosed herein can be implemented on a variety of other power machines. For example, some embodiments can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
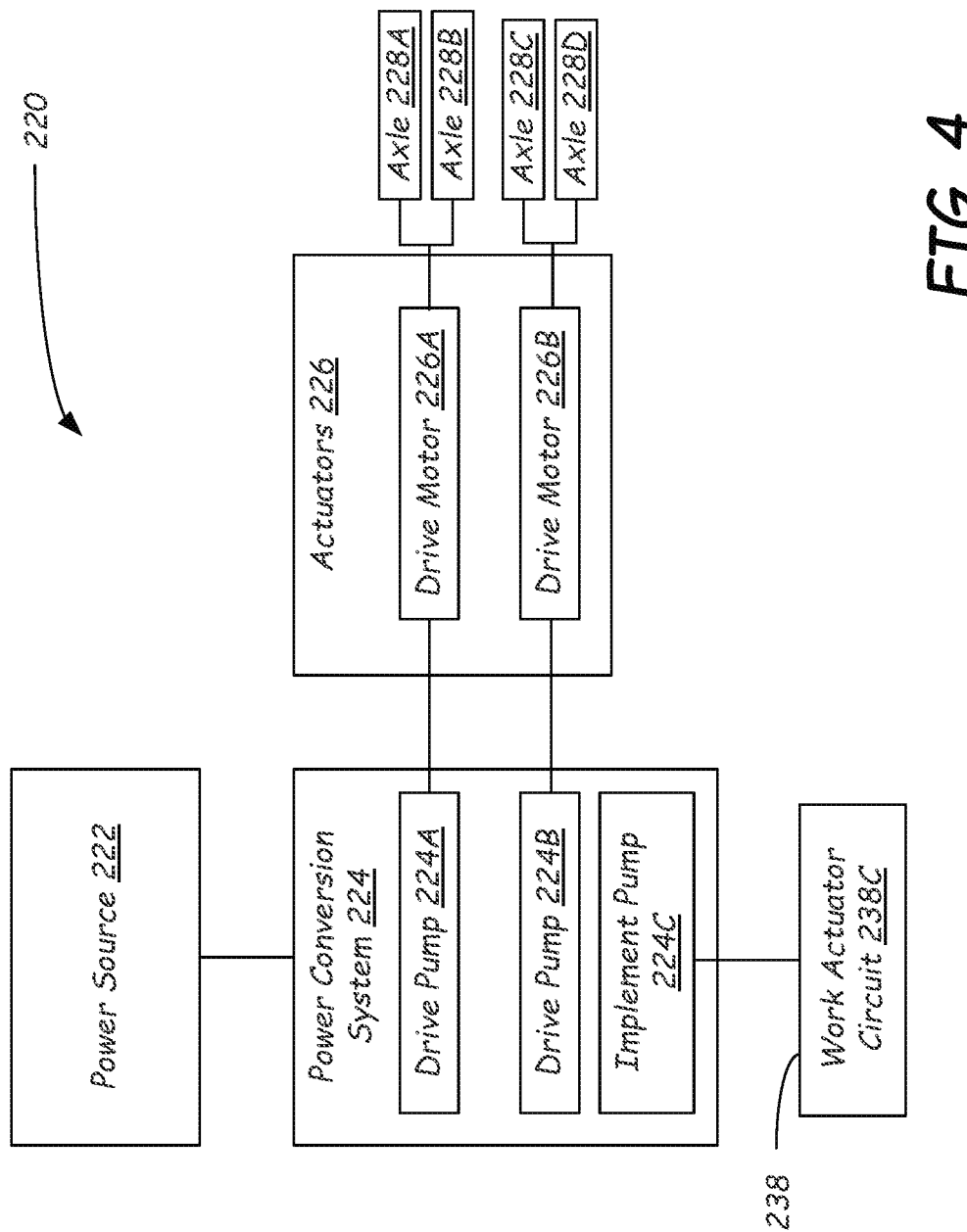
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit 238C also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
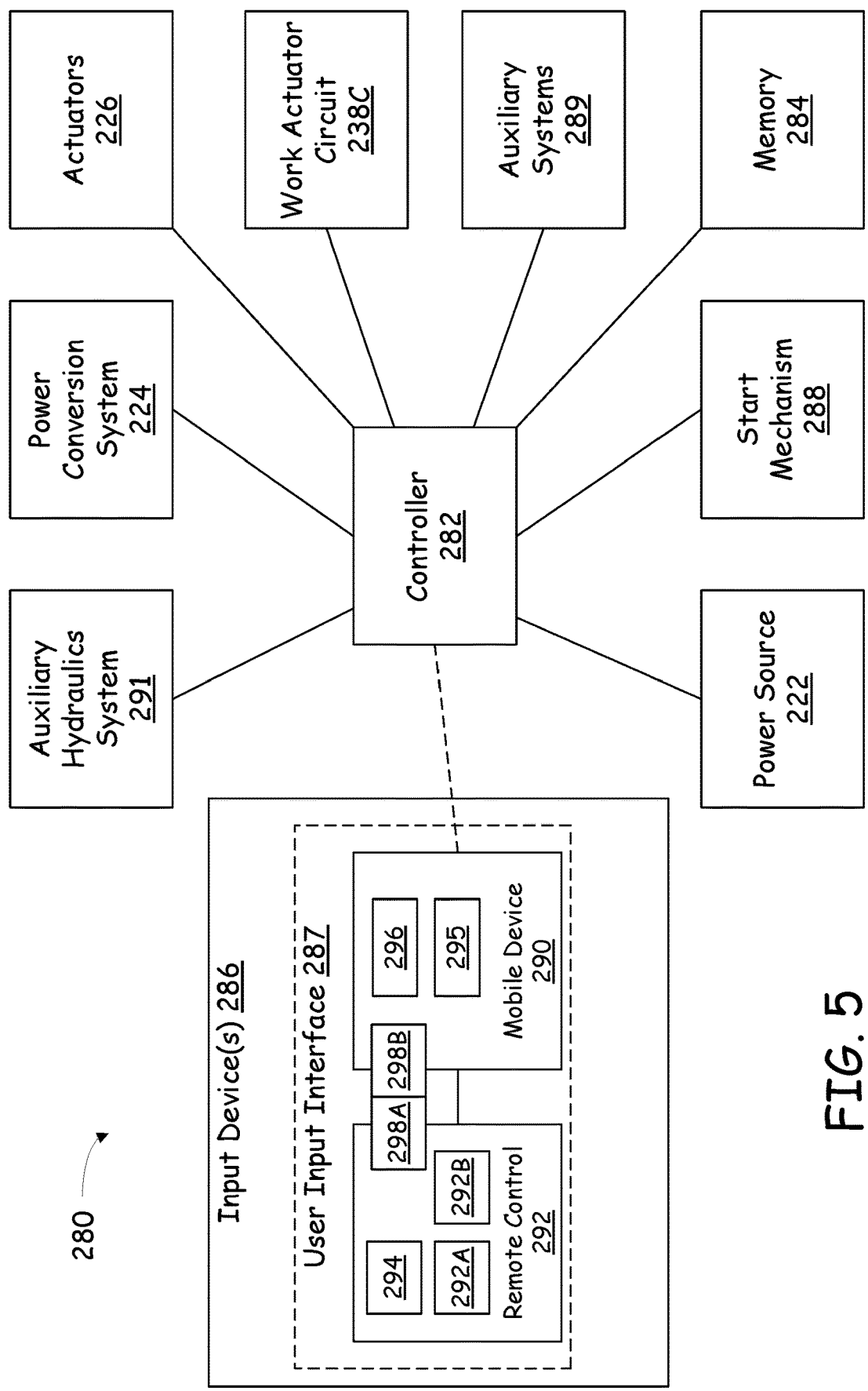
FIG. 5 is a block diagram illustrating aspects of an operating system for use with power machines, of a type on which the disclosed embodiments can be practiced.

FIG. 5 illustrates aspects of a control system 280 that can be used to control certain functionality of a power machine, including the power machine 200 of FIGS. 2 and 3. The control system 280 includes a controller 282, which can, for example, be configured as a general or special purpose electronic processing device in communication with a memory 284. According to some examples, the control system 280 can include one or more controllers. For example, some power machines may include dedicated controllers for engine control, drive control, operator input, display, radio/entertainment, and hub operations, with appropriate communication channels (e.g., buses, which can be physical or wireless) extending among the controllers and between the controllers and other components (e.g., sensors, wireless communication modules, wired communication modules, etc.). According to some examples, multiple controllers may be combined as modules within a common control device (e.g., as different software or hardware modules for a single controller). In this regard, the one or more controllers can be considered to be configured as dedicated controllers or as being integrated into a larger control device.

To allow delivery of operator input commands, one or more input devices, represented generally by input device(s) 286, are in communication with the controller 282. Operators can generally manipulate the input device(s) 286 to provide command signals to the controller 282, including according to well-known input and data transmission protocols (e.g., wireless communication, CAN bus communication, etc.). In the illustrated example, the input device(s) 286 can include a user input interface 287. For example, the user input interface 287 can be configured as a display device that can receive input from a user via the display itself (e.g., a touchscreen display device) or via one or more input devices such as buttons, switches, joysticks, and/or a keypad or other suitable devices. The use input interface 287 can also be a series of input devices, including those described above that can be manipulated by the operator.

In the illustrated example, the user input interface 287 includes a mobile device 290 and a remote control device 292. The mobile device 290 is in communication with the remote control device 292 such that inputs provided to the remote control device 292 by an operator can be transmitted to the mobile device 290. According to some examples, the remote control device 292 can be in communication with the mobile device 290 via a wireless connection that can be established by a wireless communication module 294 on the remote control device 292 and a wireless communication module 296 on the mobile device 290 (e.g., a wireless device adapted to communicate using Wi-Fi, near-field communication (NFC), Bluetooth, or other suitable wireless communication protocol). In some examples, the wireless communication module 296 or another wireless communication module on the mobile device 290 can be adapted to communicate with external systems, including external networks or remotely located power machines (e.g., via a wireless module of the controller 282). In some examples, the wireless communication module 296 may communicate with the remote control device 292 using a different communication protocol than is used to communicate with external networks or power machines. For example, the mobile device may communicate with the remote control device 292 using lower-power, lower-range communication protocols and with the controller 282 using higher-power, longer-range communication protocols.

According to other examples, the remote control device 292 is communicatively coupled with the mobile device 290 via a wired connection, as can sometimes provide improved security, rates of data transfer, and structural robustness. For example, as shown in FIG. 5, the remote control device 292 can additionally or alternatively include a wired connection module 298A that is adapted to mechanically engage with a wired connection module 298B of the mobile device 290

The remote control device 292 can include a plurality of operator input modules 292A, 292B, etc. that are configured for manual actuation to provide corresponding control signals (i.e., operator input signals) to the mobile device 290. For example, manual actuation to generate operator input signals can be provided via buttons, switches, joysticks, or other known devices for generating electronic control signals based on movements by an operator, etc. The mobile device 290 can include a processor device configured to receive the control signals from the remote control device 292, and then output command signals to the controller 282 of the control system 280 on the power machine 200 based on the received control signals from the remote control device 292.

According to some examples, multiple input devices can be configured to receive inputs from an operator. For example, the mobile device 290 can include a display (e.g., a touchscreen display). The processor on the mobile device 290 can be configured to generate a graphical user interface ("GUI") on the display that includes a plurality of digital inputs (e.g., digital buttons, joysticks, or sliders generated on the display). The display on the mobile device 290 can receive control signals due to activation of the digital inputs on the display (e.g., manual selection, sliding, or tapping of parts of the GUI), and then output command signals to the controller 282 of the control system 280 on the power machine 200 based on the received control signals.

The controller 282 on the power machine 200 is in communication with a plurality of work elements and other components of the power machine to control operation thereof. For example, the controller 282 can be in communication with a start mechanism 288, the power conversion system 224 (see also FIG. 4), the actuators 226 (see also FIG. 4), the auxiliary hydraulics system 291 (see also FIG. 4), the power source 222 (see also FIG. 4), and the work actuator circuit 238C (see also FIG. 4). Thus arranged, the controller 282 can receive command signals from the mobile device 290 in communication therewith to command, for example, the start mechanism 288 to prompt a commanded startup of the power source 222 (e.g., an internal combustion engine), as well as other inputs to selectively operate devices of the power conversion system 224, the actuators 226, auxiliary systems 289 (e.g., HVAC systems, radios, etc.), the auxiliary hydraulic system 291, or the work actuator circuit 238C, and thereby control a variety of power machine functionality based on the received command signals.

Figure 6:
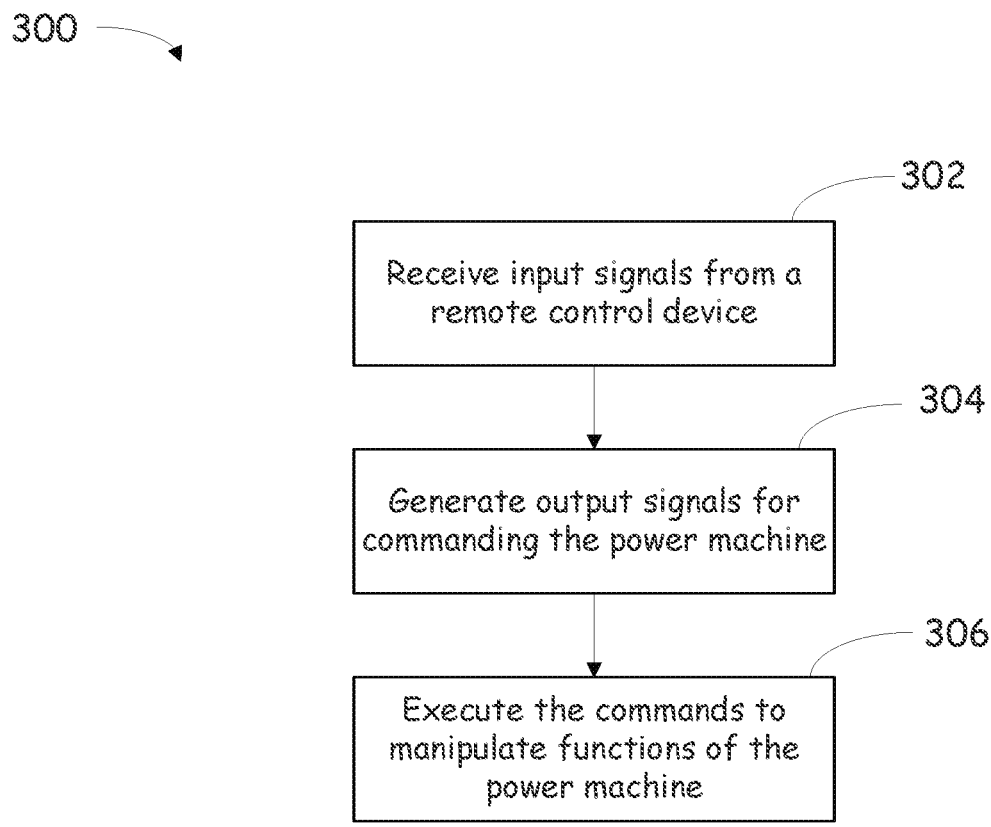
FIG. 6 illustrates a process of remotely controlling power machine functionality utilizing a remote control and a mobile device.

In this regard, referring now to FIG. 6 as well as FIG. 5, an example control method 300 for remotely controlling functionality of the power machine 200 is presented, as may be generally executable by the remote control device 292, mobile device 290, controller 282, and the control system 280 (FIG. 5). Although reference is made to the power machine 200 in particular, the methods disclosed herein, including as illustrated in FIG. 6, can generally be implemented with any variety of other power machines. Further, although execution of the illustrated operations is discussed below as being resident on particular platforms (e.g., a mobile device, or a power machine) other platforms (e.g., a power machine or a mobile device, respectively) can execute other operations in other embodiments.

In the illustrated example, the method 300 can begin at block 302 by receiving, at the mobile device 290 (see FIG. 5), an input signal (e.g., an input command) from the remote control device 292 (see FIG. 5) based upon the manual actuation of one or more of the plurality of operator input modules on the remote control device 292. Upon receiving the input signal, the processor on the mobile device 290 is configured at block 304 to generate an output signal (e.g., an output command) for commanding functions of the power machine 200. The mobile device 290 can then provide the output signals to the controller 282 of the power machine 200 by a wireless communication system on the mobile device 290. At block 306, the controller 282 (see FIG. 5) can then execute commands based on the received output signals to control various (e.g., full) functions of the power machine 200.

In some embodiments, a mobile device can generate output signals that are derived from, but not the same as, input signals from a remote control. For example, a mobile device can sometimes receive input signals that are generated according to a first communication or command protocol and, in response, generate corresponding output signals according to a different communication or command protocol. In some embodiments, a mobile device can generate output signals that are identical to the input signals, and thereby act as a direct relay of input signals from a remote control to a power machine. In some embodiments, a mobile device can generate a combination of identical and derived output signals, based on a particular received input from a remote control.

According to some examples, dual- (or hybrid-) remote control can be accomplished by selectively using the operator input modules on the remote control device 292 or the digital inputs on the GUI displayed on the mobile device 290. For example, according to method 300, some input signals can be generated by interaction with a digital input on a display 295 of the mobile device 290 (e.g., rather than via manual actuation of the remote control device 292). Thus, for example, an operator may also be able to seamlessly switch between providing inputs on the remote control device 292 and the mobile device 290. In some cases, an operator may be able to simultaneously utilize the operator input modules on the remote control device 292 and the digital inputs on the GUI provided by the mobile device 290. This can be beneficial, for example, should an operator wish to utilize a digital input (e.g., on a touchscreen) for certain functions, or to utilize a manual operator input module (e.g., a joystick) for other functions. Further, in some cases, additional functionality can thus be introduced into a GUI, including with regard to space on the GUI that had been dedicated to input features that can be alternatively controlled via the attached remote control. As appropriate, the method 300 can then proceed through blocks 304 and 306, as described above.

According to some examples, the operator input modules on the controller 292 and/or the digital inputs displayed on a GUI generated by the mobile device 290 can be configured to, upon actuation, generate command signals that can be executed by the controller 282 to start the power source 222 by the start mechanisms 288, unlock machine functionality (e.g., by a "Press to Operate" feature), or manipulate drive functions by the power conversion system 224 (e.g., engage drive pumps 224A, 224B and drive motors 226A, 226B to maneuver the power machine left, right, forward, and reverse). According to other examples, operator input modules on the controller 292 and/or the digital inputs displayed on a GUI generated by the mobile device 290 can be configured to control actuators 238 of the work actuator circuit 238C (e.g., to control lift and tilt functions), operate auxiliary hydraulics 291, control variable auxiliaries and continuous flow hydraulics, adjust engine speed (e.g., adjust an engine speed of the power source 222), operate an emergency stop switch, operate control speed management (engaged/disengaged), operate speed management adjustments (e.g., toggle between rabbit/turtle modes), and operate secondary auxiliary controls.

According to some examples, operator input modules on the controller 292 and/or the digital inputs displayed on a GUI generated by the mobile device 290 can be configured to control settings (e.g., controller 282 settings, engage parking brakes, operate a work light, etc.), operate a horn, engage a lift arm float function. According to some examples, the operator input modules on the controller 292 and/or the digital inputs displayed on a GUI generated by the mobile device 290 can be configured to generate a "vitals" GUI on the display of the mobile device 290 to display various vitals of the power machine 200 (e.g., fuel level, DEF level, operating hours, system voltages, engine oil pressure, engine coolant, temp, hydraulic fluid temp, hydrostatic pressure, etc.).

Figure 7:
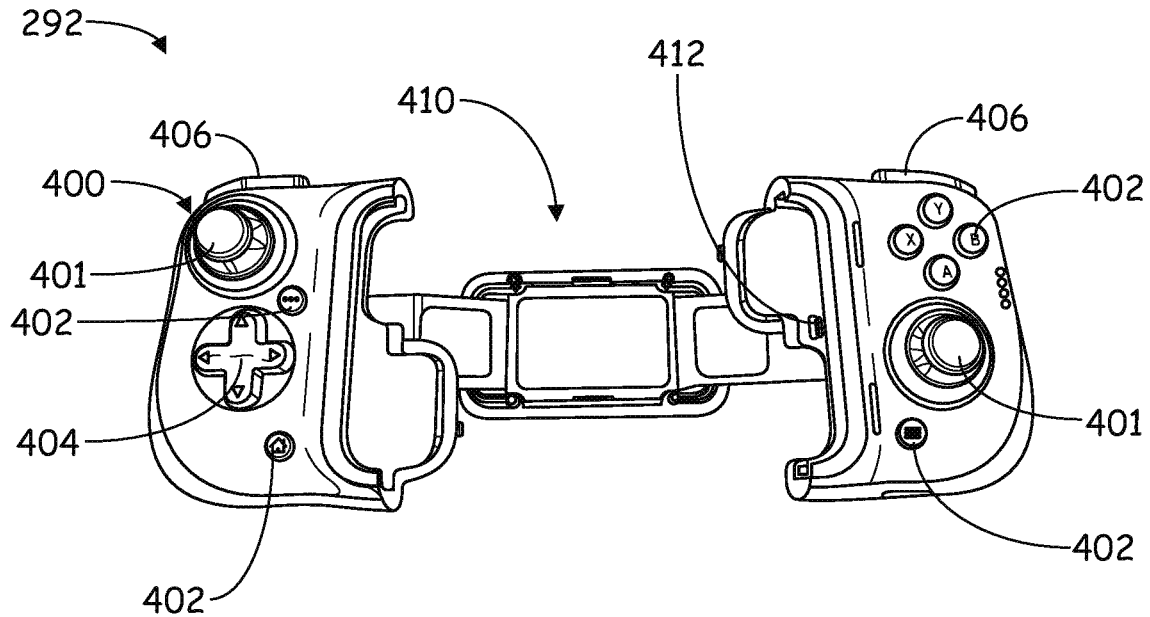
FIG. 7 illustrates a remote control configured to be tethered to a mobile device.
Figure 8:
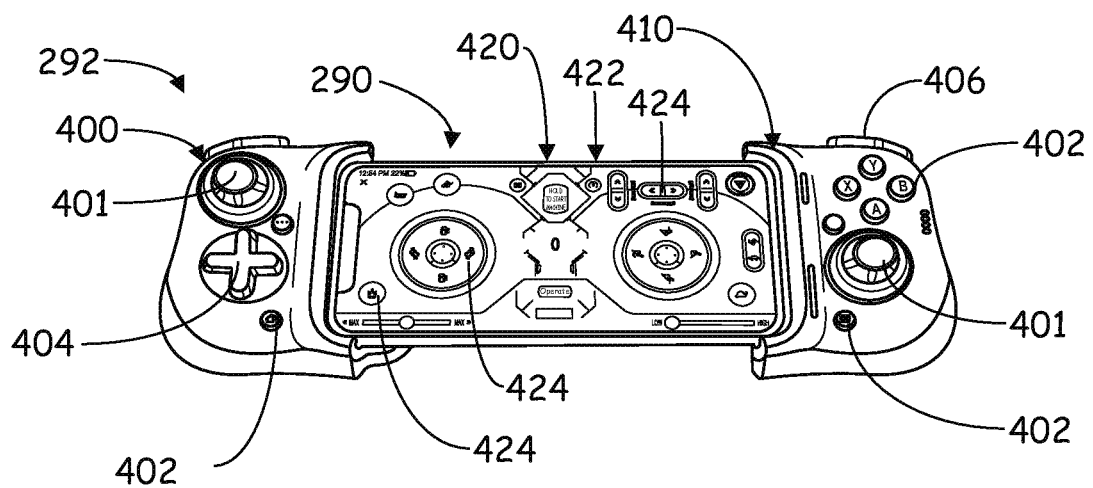
FIG. 8 illustrates the remote control device of FIG. 7 tethered to a mobile device.
Figure 9:
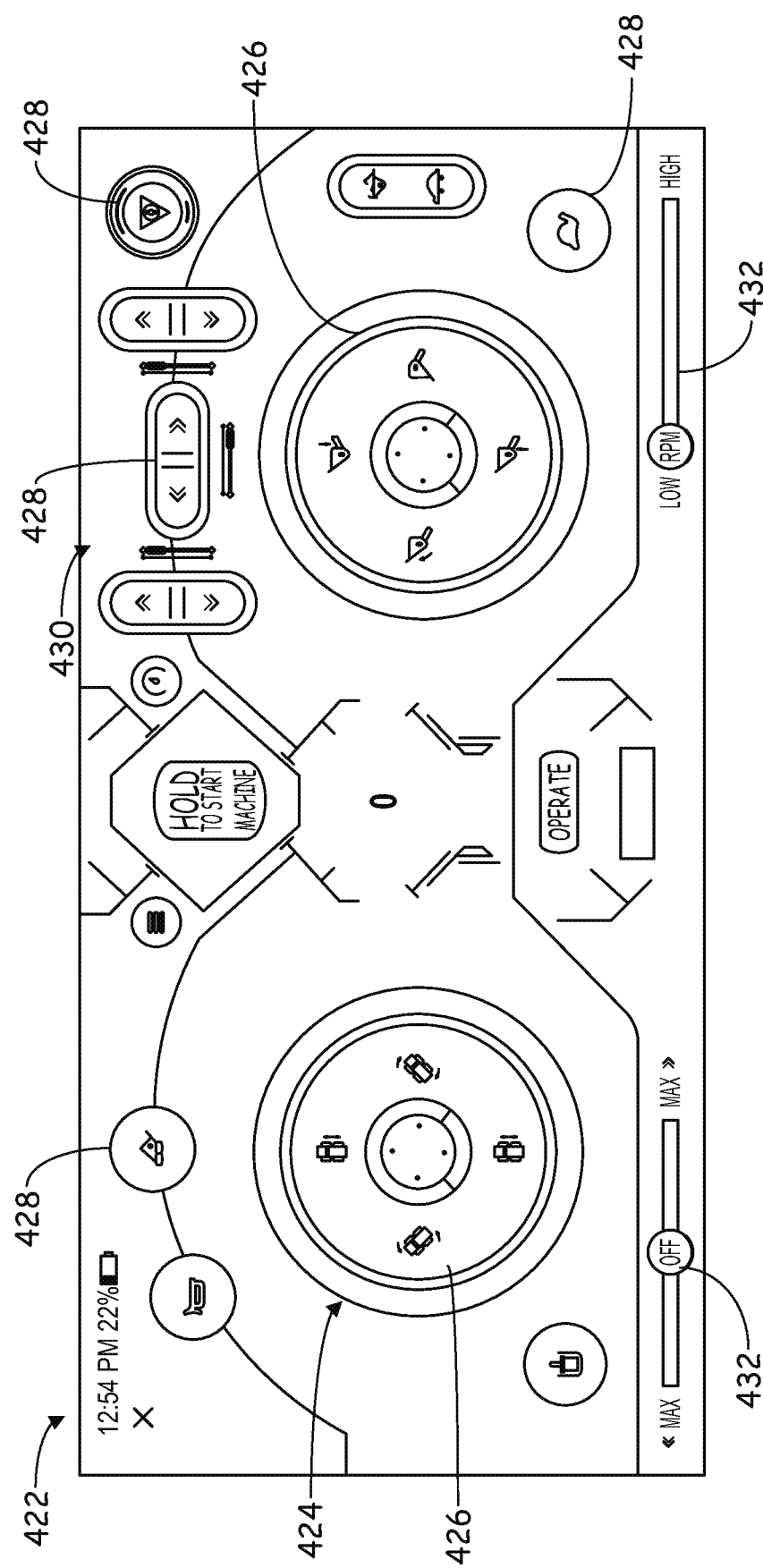
FIG. 9 illustrates an example graphical user interface generated on a device for controlling power machine functionality in conjunction with the remote control device.

According to other examples, including as expressly described below, each (or some) of the plurality of operator input modules on the remote control device 292 can be mapped, or otherwise correspond, to a digitally enabled representation of an input on the GUI on the display of the mobile device 290. FIGS. 7-9 illustrate an exemplary remote control device 292 and a mobile device 290 configured as a smart phone, with the remote control device 292 communicatively coupled with the mobile device 290 in FIG. 8. In the illustrated example, the remote control device 292 is configured as a hand-held device and can include a plurality of manually operable operator input modules 400 including at least one joystick 401. According to the illustrated example, the remote control device 292 includes two joysticks 401. The remote control device 292 can further include a plurality of buttons or switches 402, a directional pad 404 ("D-pad"), and one or more triggers 406.

In the illustrated example, the remote control device 292 can include a receptacle 410 and a data connector 412. The receptacle 410 is configured to receive the mobile device 290 (FIG. 8). According to some examples, the receptacle 410 can be configured to grip and hold the mobile device 290. The data connector 412 is configured to communicatively couple the remote control device 292 to the mobile device 290 at an input port (not shown) arranged on the mobile device 290. The data connector 412 can be configured as any known type of data connectors (e.g., Lightning® connectors, USB type A, B, or C connectors, micro USB connectors, etc.) for use with corresponding known types of data ports for mobile devices. (Lightning is a registered trademark of Apple, Inc. in the United States or other jurisdictions.) In the illustrated example, the data connector 412 is configured for a wired connection between the remote control device 292 and the mobile device 290, although, as discussed above, a wireless data connection could also be utilized.

Likewise, although a particular engagement structure is shown for securing the remote control device 292 to the mobile device 290, a variety of mechanical or other arrangements are possible. According to the illustrated example, the remote control device 292 is configured to collapse from an open configuration to receive the mobile device 290 in the receptacle 410, and a closed configuration for transport. According to other examples, the remote control device 292 may include a cable connection between the mobile device 290 and the remote control device 292 such that the remote control device 292 is separated from the mobile device 290.

With particular reference to FIGS. 8 and 9, the mobile device 290 can include a display 420 with a graphical user interface 422 generated thereon. The GUI can include a plurality of digital inputs 424. The plurality of digital inputs 424 can include digital joysticks 426, a plurality of selectable digital input buttons or switches 428, a digital directional pad 430, and one or more digital sliders 432. In the illustrated example, each of the operator input modules 400 (see FIG. 7) can correspond to one of the digital inputs 424 on the GUI 422. For example, the joystick 401 on the remote control device 292 can correspond to the digital joystick 426 on the GUI 422. According to some examples, movement or selection of the operator input modules 400 on the remote control device 292 can be mirrored on the corresponding digital inputs 424 on the GUI 422.

According to some examples, the processor on the mobile device 290 can identify, upon the connection with the remote control device 292, the relevant controller layout (e.g., by the type of controller and/or the number of operator input modules) and can map the operator input modules to the digital inputs on the GUI 422 based on a predetermined controller layout stored within a memory on the mobile device 290. According to some examples, upon an initial connection between a mobile device 290 and a remote control device 292, the mobile device 290 can generate a training GUI in a training mode to guide an operator through operation of a power machine using the remote control. In some examples, an operator may be permitted to selectively map particular input devices on a remote control to particular digital inputs or other functional controls associated with a GUI or other power-machine control interface.

According to some examples, an operator can have access to full functionality of the power machine 200 using the remote control device 292. According to other examples, limited functionality can be enabled when using the remote control device 292. For example, a maximum speed of the power machine may be limited while the remote control is being utilized. According to some examples, haptic feedback on the mobile device 290 may be used to provide feedback to an operator. According to other examples, vibration motors within the remote control device 292 can be utilized to provide feedback to an operator.

According to some examples, the remote control device 292 can be provided as a kit. For example, a kit can include the remote control device 292 as well as access to software downloadable on the mobile device 290 to generate the GUI 422 via the processor on the mobile device 290 or otherwise interface with the remote control device 292 for control of a power machine. According to other examples, the remote control device 292 and the mobile device 290 can be included in a kit. According to yet further examples, the remote control device 292 and the mobile device 290 can be included in a kit that accompanies a power machine (e.g., power machine 200 described herein).

In some examples, a mobile device can be configured to evaluate aspects of a control signal from a remote-control device to evaluate whether the signal corresponds to an acceptable operator input or not. In other words, characteristics of an operator input signal that is received at a mobile device can be analyzed to determine whether the input signal may correspond to actual operator inputs or may be an exception signal that results from input, signal-generation, or other error at a joystick or other operator input module.

In some examples, analysis of an operator input signal can include analysis of the signal to identify a corresponding actual or virtual (i.e., apparent) movement pattern of an operator input device and to implement corrective modification of command signals accordingly. As used herein, a "movement pattern" indicates a set of data, spread over a non-zero time interval, that characterizes one or more spatial or temporal patterns of an actual or virtual movement of an operator input device. As one example, for a particular control signal, a corresponding movement pattern for a joystick can include parameters that specify a path of the joystick handle or other joystick command position within a spatially bounded envelope that is defined by a remote control device (e.g., a structurally bounded envelope that physically limits movement of a joystick beyond certain positions). As another example, for a particular control signal, a corresponding movement pattern for a joystick can include parameters that specify a velocity or an acceleration of joystick command position within a relevant spatial envelope.

In some cases, identifying a particular movement pattern can inform determination of whether a corresponding control signal is acceptable or is unacceptable (e.g., whether the corresponding control signal was actually provided by manual operator input or may have been generated in error by a remote control device and should be treated as an exception). For example, whereas human operators are generally not capable of providing mechanistic movement of a joystick or other manual input device, some remote control devices may sometimes generate signals that correspond to apparent mechanistic movement (i.e., that have patterns corresponding to actual mechanistic movement of the joystick, even if the joystick has not actually moved in a corresponding pattern). Thus, in some cases, identification of mechanistic movement pattern of an operator input device (e.g., a joystick) can allow a control system to identify that the corresponding control signals are potentially erroneous, and to implement appropriate control measures accordingly.

In some cases, analyzing an input command or other control signal to identify exception command movements can include analyzing whether a corresponding control position of a joystick or other input device has moved along a mechanistically linear path (i.e., exhibited no deviation from a linear path, or exhibited deviation only below a threshold percentage of a maximum possible deviation). For example, a potentially erroneous control signal may be identified upon determining that a corresponding movement pattern of a joystick is a fully linear movement of the joystick from neutral to a full-forward drive command or other fully-forward position of the joystick (i.e., a movement with no deviation from a line between the neutral and fully-forward positions).

In some cases, movement along a mechanistically linear path can correspond to movement of a control device only within a relatively narrow path band. For example, a joystick or other similar input device may exhibit a first neutral axis for forward/reverse movements of the joystick and a second neutral axis for lateral movements of the joystick. In such cases, control signal can be identified as corresponding to a mechanistically linear path based on the control signal corresponding to an operator input that moves an operator input device along either of the neutral axes without deviation from a relatively narrow neutral band around each axis (i.e., spatial regions of potential control positions around the axes that are treated by a control system as also providing a neutral command corresponding to the associated axis). Similar approaches with surrounding bands of equivalent control can also be applied for other predetermined curvilinear control movement paths.

In some cases, analyzing an input command or other control signal for mechanistic movement can include analyzing whether a corresponding control position of an input device has remained mechanistically fixed (i.e., exhibited no movement away from a particular position, or exhibited movement only below a threshold percentage of a maximum possible deviation), at least outside of fixed positions corresponding to any applicable mechanical or other detent positions for the control device. For example, a potentially erroneous control signal may be identified upon determining that a corresponding movement pattern of a joystick includes a mechanistically fixed lack of movement of the joystick away from a current position, where that current position is not a neutral position or other position corresponding to a preset mechanical detent or stop for the joystick.

In some cases, analyzing an input command or other control signal to identify exception command movements can include analyzing whether the control signal corresponds to a discontinuous movement of an operator input device. For example, a control signal can be analyzed to determine whether the control signal corresponds to a joystick or other manual control device having moved between command positions without passing through a sufficient number of intervening positions (e.g., any intervening positions for spatially separated starting and ending positions). In some digital systems, whether a control signal corresponds to a discontinuous control movement can depend on whether the signal corresponds to the relevant control device being in different control positions at successive sampling times, where the different control positions are spatially separated by a larger distance than can be crossed by manual movements of the control device (e.g., as specified by a predetermined threshold apparent velocity or acceleration for an operator input the control device).

As generally noted above, upon identifying an unacceptable control signal from a remote control device, corresponding adjustments to the command signals transmitted to a power machine can be implemented. For example, upon identifying a potentially erroneous control signal, a control system can de-rate a command signal to a power machine so as to effectively de-rate operation of a particular actuator or other sub-system of the power machine. In other words, upon identifying an exception control signal from a remote control device, a control system can correspondingly reduce a gain of an associated command signal to a power machine, or otherwise similarly modify the command signal, so that the power machine operates at a reduced power, speed, acceleration, or other operating threshold as compared to operation without the modification.

Figure 10A:
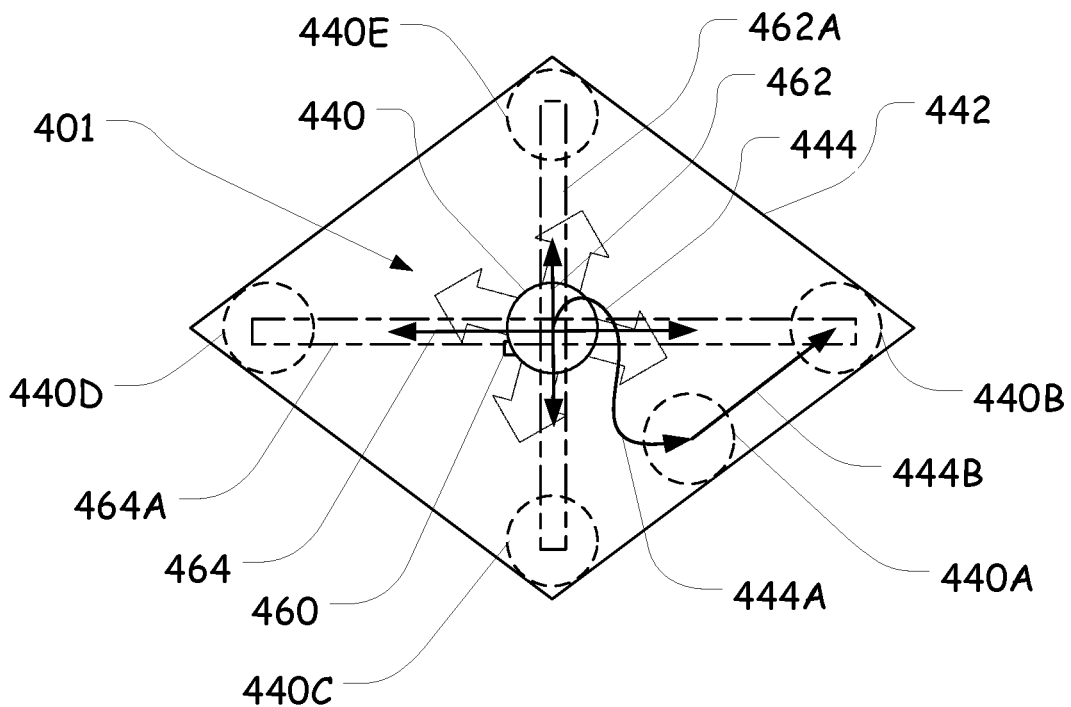
FIGS. 10A and 10B is a schematic illustration of an operator input device capable of various movement patterns for the operator input device.

Referring now to FIG. 10A, in some examples, a handle 440 or other control interface of the joystick 401 can be moved in any direction within a spatial envelope 442 to generate control signals for control of a power machine. Thus, the handle 440 and a corresponding control position of the joystick can generally be moved manually by operator input to exhibit a wide variety of control movement patterns within the spatial envelope 442. These movement patterns in turn may correspond to the generation of a similar variety of control signals to prompt wireless transmission of command signals to a power machine.

In particular, FIG. 10A illustrates an example control path 444 that includes an arbitrary curvilinear portion 444A that extends from a neutral position (see solid-line representation of the handle 440) to an outer edge of the spatial envelope 442 (see dashed-line representation 440A). The control path 444 further includes a linear portion 444B that is mechanically bounded by the spatial envelope 442 and ends at a right-side limit of the spatial envelope 442 (see dashed-line representation 440B). However, other paths and combinations of paths are possible in other examples, including as part of movement patterns that move the handle 440 to a lower-side, left-side, or top-side limit as also shown in dash-line representations 440C, 440D, 440E, respectively. Similarly, although the spatial envelope 442 can be defined by contact between the handle (or other joystick components) and one or more mechanical stops on the remote control device 292, otherwise bounded envelopes for movement of input devices are also possible.

As also discussed above, a particular operator input signal provided by a remote control device may correspond to a particular movement pattern of the relevant operator input device. Further, movement patterns can be analyzed in some cases, including by using generally known signal analysis techniques of corresponding control signals, to identify if the movement patterns correspond to command errors at the remote control device (i.e., of the movement patterns are exception movement patterns).

Figure 10B:
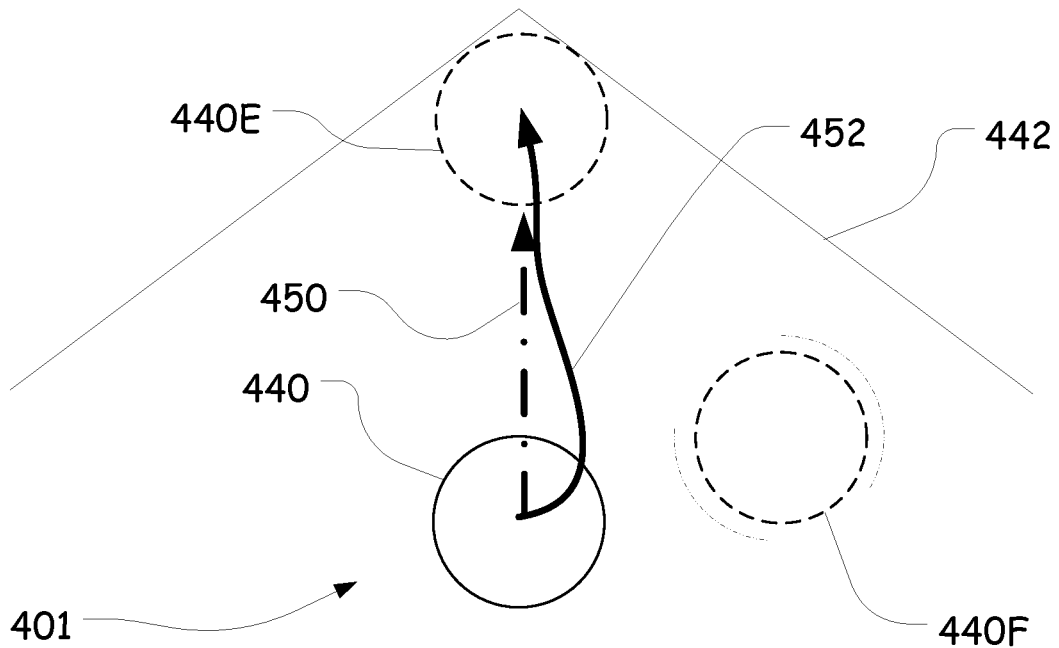

As one example, referring to FIG. 10B, one type of remote control device error can provide a control signal that corresponds to a purely linear movement pattern 450 between the neutral and fully-forward positions of the joystick handle 440, 440E. As noted above, such a mechanistic movement may not be possible for an operator to actually provide manually. Thus, in some cases, the linear movement pattern 450 can be identified as an exception movement pattern, a control signal corresponding to the movement pattern 450 can be correspondingly identified as an exception signal, and appropriate control steps can then be implemented. For example, as noted above, upon identifying that a received control signal corresponds to the mechanistic movement pattern 450, a command signal to a power machine can be de-rated accordingly.

In contrast to the mechanistically linear characteristic of the movement pattern 450, a movement pattern 452 generated by actual manual input may not be mechanistically linear, or may otherwise exhibit relevant non-mechanistic aspects. Thus, a control signal corresponding to the movement pattern 452 can be identified as corresponding to an actual operator input (i.e., not an exception), and control of the power machine can proceed accordingly.

As another example, a control signal can be identified as not acceptable if the control signal is determined to correspond to a discontinuous movement pattern based on a lack of deviation of a corresponding control movement from a neutral band of the joystick 401 (e.g., as may not be practically possible for many manually guided movements). For example, referring again also to FIG. 10A, for a control signal that corresponds to the movement pattern 450 (see FIG. 10B), whether the control signal is mechanistically linear or otherwise not acceptable can be determined based on whether the movement pattern deviates from a neutral band 462A around a front-to-back neutral axis 462 (i.e., extends outside of the neutral band 462A). Similar approaches can also be applied relative to a neutral band 464A around a lateral neutral axis 464, or other bands around other types of control axes or other predetermined movement paths for operator inputs at an operator input device.

In some examples, the neutral band 462A or the neutral band 464A can include a maximum perpendicular deviation from the corresponding neutral axis 462, 464 of 2% or less of a total possible command value (e.g., command gain or command movement distance) of the joystick 401. In other words, the neutral bands 462A, 464A may not encompass commands corresponding to deviation from the corresponding neutral axes 462, 464 by more than 2% of a maximum possible command position or gain, in a movement or control direction that is perpendicular to the relevant axis 462, 464.

In some implementations, differently configured neutral bands can be used relative to the axes 462, 464. Likewise, similarly or differently configured neutral bands can be used relative to other neutral axes for an operator input device, for neutral positions of an operator input device, or for other predetermined control movement paths. Similarly, differently configured neutral bands or other parameters for evaluating whether control signals are acceptable can be applied for different types of controls.

In some cases, neutral bands can exhibit characteristics for tractive commands (i.e., for control of tractive actuators to control travel of a power machine) and can exhibit different characteristics for workgroup commands (i.e., for control of lift, tilt, slew, or other non-tractive work actuators). For example, the neutral bands 462A, 464A may be symmetrical and exhibit a 2% width for tractive commands, as discussed above, whereas one or both of the neutral bands 462A, 464A may be non-symmetrical or exhibit a larger width (e.g., 20% of a corresponding maximum control range) for certain workgroup commands.

Some implementations can include relatively large widths of a neutral band in a first control direction and relatively small widths of the neutral band in a second control direction. For example, during control of lift arm operations, exiting a float mode that provides floating operations for the lift arm, or another control mode, can require deviation of 10%, 20% or more from a corresponding neutral axis in a first direction (e.g., moving from neutral toward 440E in the configuration shown in FIG. 10A) and can ignore deviation from the neutral axis in a second direction (e.g., moving from neutral toward 440C in the configuration shown in FIG. 10A). Similar configurations can also apply in other contexts, as can configurations with other ranges and combinations of neutral band widths along one or more relevant control movement paths.

In some cases, a control signal can be identified as not acceptable if the control signal is determined to correspond to a mechanistically static movement pattern. For example as also shown in FIG. 10B, an erroneous control signal can be identified corresponding to the handle 440 remaining relatively motionless as shown at 440F, without being aligned to be held by a positional detent for the joystick. In contrast, if the location shown at 440F corresponds to a positional detent for the handle 440, or sufficient movement of the handle at 440F is detected (see dot-dash-dash lines), the control signal can be identified as corresponding to actual operator input (i.e., not an exception) and control of the power machine can proceed accordingly.

As another example, a control signal can be identified as not acceptable if the control signal is determined to correspond to a discontinuous movement pattern. For example, a control signal may correspond to a control movement of the handle 440 from neutral (e.g., as in solid lines in FIG. 10B) to a fully forward position or other position spaced by neutral (e.g., as shown in FIGS. 10A and 10B at 440B, 440C, 440D, 440F). If such a control signal (and apparent movement) spans less than a threshold number of control sample cycles or corresponds to an apparent velocity or acceleration of the handle 440 that exceeds a threshold expected or permitted velocity or acceleration), the control signal may be identified as not acceptable. In some cases, for example, a reference number of control sample cycles (e.g., one cycle) can be identified for a one or more types of control movements. A particular apparent movement corresponding to a control signal can then be identified as discontinuous based on the control signal corresponding to a control input the corresponds to a particular velocity, acceleration, or positional change of the operator input device, and the particular velocity, acceleration, or positional change exceeding a particular threshold value over the reference number of cycles.

Generally, as also discussed above, movement patterns that indicate a control signal as unacceptable can be referred to as exception movement patterns. If a control signal is determined to correspond to an exception movement pattern, a control system can apply a corresponding exception modification, under one or more corresponding exception modes of operation, to provide a command signal for actual control of a power machine. For example, as also discussed above, an exception modification for a command signal in some exception modes can include a de-rating of the command signal (as compared to if the exception modification were not applied with respect to the same control signal). In other examples, other exception modifications can also or alternatively be applied, as defined according to corresponding exception modes. In some cases, different exception modes can define and apply the same type of exception modification but with different magnitudes or timings (e.g., with different relative magnitude of de-rating). In some cases, different exception modes can define and apply different exception modifications depending on the type of operation being commanded (e.g., with different relative magnitude of de-rating for travel commands as compared to commands to a workgroup of a power machine that includes lift, tilt, slew, or other non-tractive actuators).

In some cases, a control system can be configured to transition out of or between exception modes based on further inputs. For example, some control systems can be configured to remain in an exception mode, with a corresponding exception modification for a command signal, until analysis of a subsequently received control signal indicates that the control signal corresponds to an acceptable operator input (e.g., a non-mechanistic movement pattern for a joystick). Upon identifying the acceptable operator input, the control system can then exit a current exception mode and proceed with control operations accordingly (e.g., with corresponding cessation of the application of one or more exception modifications to a command signal).

As another example, some control systems can include operator input devices that are configured to receive override inputs, i.e., operator inputs that override one or more aspects of an exception modification or operation in an exception mode. Referring again to FIG. 10A, in some implementations the joystick handle 440 can include an override button 460 that can be manually engaged by an operator to exit an exception mode or otherwise override one or more aspects of an exception modification of a command signal. For example, upon detecting that command signals based on movement of the handle 440 are being de-rated, an operator can selectively engage the override button 460 to cause the control system to stop the de-rating of the command signals. Thus, for example, an operator can selectively override operation in an exception mode to ensure continued operation of a power machine as desired (e.g., to maintain a suitably efficient speed while roading).

Figure 11:
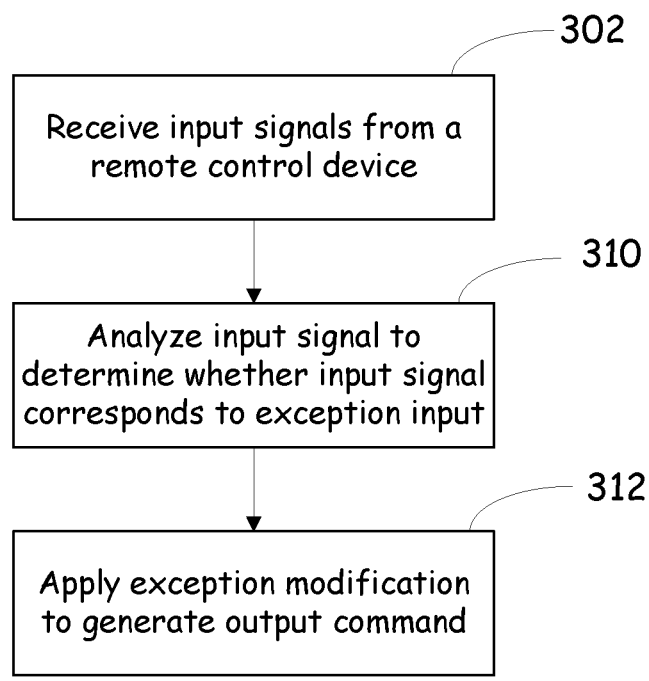
FIG. 11 illustrates further aspects of a process of remotely controlling power machine functionality utilizing a remote control and a mobile device

Referring also to FIG. 11, in some implementations, a method according to the disclosed technology can include operations for analyzing control signals and correspondingly operating in one or more appropriate exception modes. For example, under the method 300, upon receiving input signals from a remote control device at block 302, operations at block 310 can include electronically analyzing the input command signal to determine whether the input command signal corresponds to an exception input. In other words, in some cases, operations at block 310 can include analyzing input command signals to determine whether the input command signals correspond to movement patterns of an input device that do not, in turn, correspond to acceptable operator inputs (i.e., are exception movement patterns). For example, as also discussed above, exception inputs can include input signals corresponding to mechanistically linear or fixed movement patterns for an input device. In particular, in some cases, it may be useful to identify as exception inputs one or more input command signals that correspond to fully linear movement of a joystick from neutral to a fully forward, reverse, or side position.

At block 312, in response to determining that the input command signal corresponds to an exception input, an exception modification can be applied to generate an output command signal to control a power machine. For example, as also discussed above, some exception modifications can include de-rating operation of a power machine, in whole or in part.

In some implementations, devices or systems disclosed herein can be utilized, manufactured, or configured using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing or utilizing disclosed (or otherwise known) components to support such purposes or capabilities. Similarly, unless otherwise indicated or limited, discussion herein of any method of manufacturing or using of a particular device or system, including installing the device or system, is intended to inherently include disclosure, as embodiments of the invention, of the utilized features and implemented capabilities of such device or system.

In some embodiments, aspects of this disclosure, including computerized implementations of methods according to this disclosure, can be implemented as a system, method, apparatus, or article of manufacture using standard programming or engineering techniques to produce software, firmware, hardware, or any combination thereof to control a processor device or a computer (e.g., a processor device operatively coupled to a memory) to implement aspects detailed herein. Accordingly, for example, some embodiments can be implemented as a set of instructions, tangibly embodied on a non-transitory computer-readable media, such that a processor device can implement the instructions based upon reading the instructions from the computer-readable media. Some embodiments can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to some embodiments, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIG., or otherwise disclosed herein, can be executed in different orders than are expressly illustrated or described, as appropriate for particular embodiments. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Although the present invention has been described by referring preferred embodiments, workers skilled in the art will recognize that changes may be made in form and detail without departing from the scope of the discussion.

What is claimed is:

1. A remote control system for a power machine, the system comprising:
    a mobile device including a processor device and a wireless communication system; and a hand-held remote control device including a remote control communication module configured to be in communication with the mobile device, wherein the hand-held remote control device includes a plurality of operator input modules configured for manual actuation to generate operator input signals for transmission by the remote control communication module, wherein a first of the operator input modules of the hand-held remote control device is manually movable with a plurality of movement patterns corresponding to a plurality of operator input signals;

wherein the mobile device is configured to be operatively connected to the power machine by the wireless communication system of the mobile device;

wherein the mobile device and the hand-held remote control device are remotely located from the power machine; and wherein the processor device on the mobile device is configured to:

receive an operator input signal from the hand-held remote control device via the remote control communication module, wherein the operator input signal corresponds to a first movement pattern of the plurality of movement patterns;

in response to receiving the operator input signal from the hand-held remote control device, output a command signal to a control system of the power machine via the wireless communication system to control an operation of the power machine based on operator inputs at the hand-held remote control device; and operate in an exception mode, including applying an exception modification to the command signal to control the power machine remotely, in response to identifying that the first movement pattern corresponds to a command error at the hand-held remote control device.

2. The system of claim 1, wherein the mobile device includes one of a smart phone or a tablet.

3. The system of claim 1, wherein the operator input signal from the hand-held remote control device is generated by manual actuation of one or more operator input modules among the plurality of operator input modules on the hand-held remote control device.

4. The system of claim 1, wherein the remote control communication module is a wired communication module configured to be communicatively coupled to the mobile device by a wired connection to a wired communication module of the mobile device.

5. The system of claim 1, wherein the processor device is further configured to:

generate a graphical user interface on a display of the mobile device, wherein the graphical user interface includes a plurality of digital inputs that are selectable on the display to generate corresponding signals to control the power machine remotely.

6. The system of claim 5, wherein each of the plurality of operator input modules on the hand-held remote control device corresponds to a respective digital input of the plurality of digital inputs on the graphical user interface on the display of the mobile device.

7. The system of claim 1, wherein the processor device on the mobile device is further configured to operate in the exception mode in response to identifying that the first movement pattern corresponds to a first exception pattern, wherein the first exception pattern corresponds to the command error at the hand-held remote control device.

8. The system of claim 7, wherein the first operator input module includes a joystick; and wherein the first movement pattern includes a movement pattern of the joystick within a spatial envelope defined by the hand-held remote control device.

9. The system of claim 8, wherein the first exception pattern corresponds to a mechanistically linear movement of the joystick, wherein the mechanistically linear movement of the joystick is indicative of the command error at the hand-held remote control device.

10. The system of claim 8, wherein the first exception pattern corresponds to a mechanistically fixed orientation of the joystick, wherein the mechanistically fixed orientation of the joystick is indicative of the command error at the hand-held remote control device.

11. The system of claim 7, wherein applying the exception modification to the command signal includes de-rating the command signal such that a gain of the command signal is reduced.

12. The system of claim 7, wherein the processor device on the mobile device is further configured to cease operation in the exception mode in response to receiving a second operator input signal from the hand-held remote control device that does not correspond to the first exception pattern.

13. A method of remotely operating a power machine using a mobile device, the method comprising:

electronically receiving an input command signal, at the mobile device remote from the power machine, from a hand-held remote control device in electronic communication with the mobile device;

in response to receiving the input command signal, electronically providing an output command signal, with the mobile device, to a control system on the power machine such that one or more power machine functions on the power machine are remotely controlled;

electronically analyzing the input command signal to determine whether the input command signal is indicative of a command error associated with the hand-held remote control device; and in response to determining that the input command signal is indicative of the command error, applying an exception modification to the input command signal to generate the output command signal to control the power machine remotely, wherein the input command signal is generated by actuation of a first control input of a plurality of control inputs on the hand-held remote control device.

14. The method of claim 13, wherein the hand-held remote control device is communicatively coupled to the mobile device by a wired connection between the hand-held remote control device and an input port of the mobile device.

15. The method of claim 14, wherein the first control input includes a joystick.

16. The method of claim 13, wherein electronically analyzing the input command signal to determine whether the input command signal is indicative of the command error includes electronically analyzing the input command signal to determine whether the input command signal corresponds to an exception input that is indicative of the command error associated with the hand-held remote control device; and wherein applying the exception modification to the input command signal includes applying the exception modification to the input command signal in response to determining that the input command signal corresponds to the exception input.

17. The method of claim 13, wherein applying the exception modification to generate the output command signal includes derating the output command signal based on determining that the input command signal corresponds to a mobile operator input at the hand-held remote control device that is mechanistically linear for a forward command or a reverse command, wherein the mobile operator input being mechanistically linear is indicative of the command error associated with the hand-held remote control device.

18. The method of claim 17, wherein applying the exception modification to generate the output command signal further includes modifying the derating of the output command in response to an override input at the hand-held remote control device.

19. A remote control system for a power machine, the system comprising:
   a user input interface that includes a processor device, an operator input device adapted to receive manual operator inputs and provide corresponding control signals, and a wireless communication system, wherein the operator input device is remotely located from the power machine;
   wherein the processor device is configured to:
      receive control signals corresponding to manual operator inputs at the operator input device;
      in response to receiving the control signals, cause the wireless communication system to transmit, to a control system local to the power machine, corresponding command signals to control operation of the power machine remotely;
      analyze a rate of change of the control signals over time to identify a command error associated with the control signals; and
      apply one or more exception modifications to the control signals to generate the command signals, in response to determining that the rate of change corresponds to an exception pattern for the operator input device, the exception pattern indicative of the command error.

20. The remote control system of claim 19, wherein the exception pattern corresponds to a mechanistically linear movement of the operator input device, wherein the mechanistically linear movement of the operator input device indicates the command error.

\* \* \* \* \*